United States Patent [19]

Van Wyk

[11] 3,998,503
[45] Dec. 21, 1976

[54] ELASTOMERIC BEARING

[75] Inventor: Jan W. Van Wyk, Kirkland, Wash.

[73] Assignee: The Boeing Company, Seattle, Wash.

[22] Filed: Sept. 23, 1974

[21] Appl. No.: 508,073

[52] U.S. Cl. .............................. 308/36 R; 308/6 R; 308/241; 64/27 NM; 267/57.1 A
[51] Int. Cl.² .................................. F16C 17/00
[58] Field of Search .................. 403/303, 228, 221; 267/57.1 R, 57.1 A, 63 R, 63 A, 137; 308/1 R, 2 A, 3 R, 6 R, 240, 35, 36, 168, 170, 184, 187, 241; 64/27 NM, 27 F, 27 R, 11, 19, 14

[56] References Cited
UNITED STATES PATENTS

| 2,915,306 | 12/1959 | Hickman | 267/57.1 R |
|---|---|---|---|
| 3,055,687 | 9/1962 | Hutton | 267/57.1 R |
| 3,256,049 | 6/1966 | Josephson et al. | 308/240 |
| 3,746,330 | 7/1973 | Taciuk | 267/137 |
| 3,821,882 | 7/1975 | Eheim | 267/57.1 R |

Primary Examiner—James B. Marbert
Attorney, Agent, or Firm—Brown, Murray, Flick & Peckham

[57] ABSTRACT

An elastomeric bearing is provided for oscillatory motion which is also capable of operation as a slider bearing under high radial loads and for large motions. The bearing consists of concentric bearing members with opposed recesses forming a cavity for a mass of elastomeric material bonded to the bearing members. The bearing members have opposed bearing surfaces normally spaced apart a predetermined distance, and restraining members are provided on each side of the elastomeric material to limit its axial deflection. Under heavy radial loads, the space between the bearing surfaces closes to limit the radial deflection of the elastomer. A lubricant is preferably provided between the bearing surfaces to enable them to function as a slider bearing through a relatively large angle.

8 Claims, 3 Drawing Figures

ELASTOMERIC BEARING

BACKGROUND OF THE INVENTION

The present invention relates to elastomeric bearings for oscillatory service, and more particularly to a hybrid elastomeric bearing which is also capable of operation as a slider bearing.

The bearing of the present invention is particularly suitable for uses such as hinge bearings for airframe control surfaces and hydrofoil flaps, although its usefulness is obviously not limited to these particular applications. Bearings in this type of service operate most of the time under relatively light load and with a small angle of oscillation which usually is of the order of ±5°. During some part of the operational time, however, which may be about 10% of the total time, the bearings must operate under a high radial load and with a relatively large oscillatory angle of the order of ±25° to 30° or more. While these severe conditions may exist only for relatively short periods of time, the bearing must be capable of operation under these conditions.

Elastomeric bearings are often used for oscillatory service. Conventional bearings of this type, such as are shown, for example, in Brandon et al. U.S. Pat. No. 3,690,639, consist of a plurality of concentric layers of rubber or other elastomer separated by thin metal layers to provide a laminated structure. Such bearings have the advantage of virtually infinite wear life but have limited load capacity and relatively limited torsional or angular range even when many layers of elastomer are used. Under radial load, the elastomer deflects radially which causes it to deflect axially so that it protrudes at the ends of the bearing beyond the metal laminations. Since this protruding section is unsupported, it is the location of maximum stress concentration and the permissible load on the bearing is limited by the maximum stress that can be allowed in this location. Attempts have been made to axial deflection of the elastomer, as in the above-mentioned patent, but since the elastomer is essentially incompressible, this also limits the radial deflection and the load capacity and angular range are severely limited. For these reasons, elastomeric bearings have not been usable heretofore for the type of service described above, where the bearing must be capable of occasional or intermittent operation at high loads and through large angles. Conventional slider bearings designed for the most severe conditions that may occur have therefore been used even though most of the time this capacity is not needed.

SUMMARY OF THE INVENTION

The present invention provides an elastomeric bearing for oscillatory service which has means for limiting the stresses in the elastomer, and which is capable of operation as a slider bearing under conditions of high radial load.

In a preferred embodiment, the bearing of the invention consists of concentric bearing members having opposed cylindrical recesses which form a cavity between the bearing members. A single non-laminated mass of elastomeric material is disposed in this cavity and preferably bonded to both bearing members. The bearing members have opposed cylindrical surfaces on each side of the cavity in position to engage each other but which are normally spaced apart by the elastomer to form a predetermined radial gap. Restraining members generally in the form of annular washers are placed on each side of the elastomeric material in the cavity to restrain it against axial deflection beyond a predetermined limit. Under light load, the bearing acts as a conventional elastomeric bearing for limited oscillatory movement. Under high radial loads, however, the elastomer deflects radially until the gap closes and the opposed cylindrical surfaces of the bearing members engage to limit further radial deflection, axial deflection of the elastomer being limited by the restraining members. These members have lubricant surfaces and lubricant material, or a lubricant surface, is preferably provided between the engaging cylindrical surfaces so that they are capable of relative sliding motion with low friction. The bearing is thus capable of operation as a conventional slider bearing under high load and over an oscillatory angle determined by the radial thickness and torsional deflection characteristics of the elastomer. Thus a bearing is provided which is very suitable for the type of service discussed above.

BRIEF DESCRIPTION OF THE DRAWINGS

This invention will be more fully understood from the following detailed description, taken in connection with the accompanying drawing, in which.

DESCRIPTION OF THE PREFERRED EMBODIMENT

Figure 1:
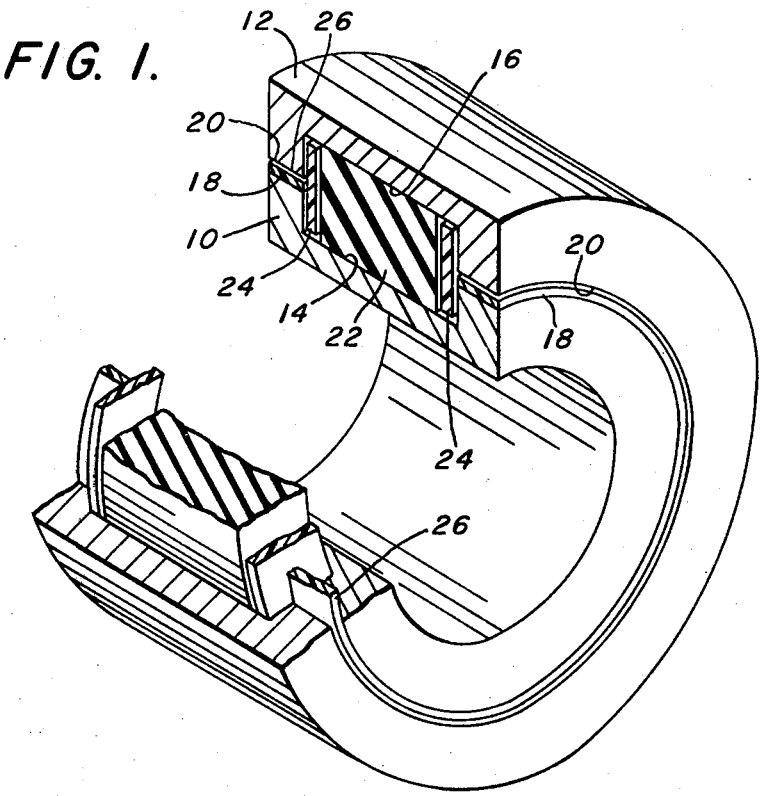
FIG. 1 is a perspective view, partly cut away, showing a bearing embodying the invention.

Referring first to FIG. 1, there is shown an illustrative embodiment of the invention in a bearing for the type of oscillatory service previously discussed. The bearing of FIG. 1 includes generally cylindrical inner and outer bearing members 10 and 12, respectively, which are relatively movable angularly with respect to each other, one preferably being stationary and the other secured on a rotary member such as a hinge member. The bearing members 10 and 12 may be made of steel and have cylindrical recesses 14 and 16 formed in the inner and outer members, respectively. The recesses 14 and 16 are directly opposed, as shown, and are preferably of the same configuration so as to form a generally annular cavity between the two bearing members 10 and 12. The bearing members 10 and 12 have opposed cylindrical bearing surfaces 18 and 20, respectively, on each side of the cavity in position to engage each other but which are normally radially spaced apart as shown in the drawing and as discussed below.

An annular mass 22 of rubber, or other suitable elastomeric material, is placed in the cavity formed by the recesses 14 and 16 as shown. The elastomeric mass 22 extends circumferentially completely around the bearing assembly and its inner and outer surfaces are in contact with the respective bearing members 10 and 12 and are preferably bonded thereto. The elastomer 22 is a single, uniform, non-laminated member and is made of sufficient radial thickness to be capable of torsional deflection to the extent necessary for the maximum required relative movement between the members 10 and 12. The thickness of the elastomer 22 and the depth of the recesses 14 and 16 are such that in the normal undeflected position shown in FIG. 1 the bearing surfaces 18 and 20 are spaced apart to form a predetermined radial gap corresponding in width to the maximum permissible radial deflection or compression of the elastomeric member 22.

Axial deflection of the member 22 is limited by restraining members 24 disposed on opposite sides of the elastomer in the cavity between the bearing members. The members 24 are annular members adapted to fit in the cavity, as shown, and are preferably of a material having self-lubricating or low friction characteristics, such as polytetrafluoroethylene (TEFLON), which may be filled or reinforced if desired and made of sufficient thickness for the purpose. The restraining members 24 are placed in the cavity as shown with a small axial clearance to permit a limited deflection of the elastomer 22 in the axial direction corresponding to the allowable radial deflection. The opposing bearing surfaces 18 and 20 preferably have lubricating or low friction surfaces, or lubricant members 26 may be placed between these surfaces. The members 26 may be made of a material such as polytetrafluoroethylene, or any suitable lubricant material, to minimize friction between the surfaces 18 and 20.

In operation under relatively light radial loads, the bearing members 10 and 12 are held in the position shown by the elastomer 22 and can move angularly with respect to each other through a substantial angle of oscillatory movement. In this mode of operation, the bearing has all the advantages of the conventional elastomeric bearing, primarily substantially infinite wear life. If a high radial load is applied to the bearing, however, beyond the desired maximum for operation as an elastomeric bearing, the elastomer 22 is radially deflected or compressed sufficiently to close the radial gap and the surfaces 18 and 20 engage each other. The restraining members 24 engage the side surfaces of the elastomer 22 which expands axially as it is compressed radially, and the members 24 limit this axial deflection to a predetermined amount so that the elastomer is restrained within the cavity with minimum deflection and without the undesirable stress concentration which occurs in conventional elastomeric bearings. Thus, under these high load conditions, the elastomer 22 is compressed only to the desired extent and when the maximum radial deflection is reached, the gap between the surfaces 18 and 20 closes and the load is carried on these surfaces, thus limiting the stress in the elastomer.

The thickness of the elastomer is made such that the permissible torsional deflection is great enough for the desired angular oscillatory movement which, in the type of service for which this bearing is particularly suited, may be as great as ±25° to 30°. The lubricant material 26 permits relative movement of the surfaces 18 and 20 with low friction so that in this mode of operation, the bearing functions as a conventional slider bearing with the characteristic high load capacity. The lubricating material of the restraining members 24 permits this relatively large angular movement of the bearing members without excessive sliding friction on the elastomer itself. It will be seen, therefore, that a hybrid bearing is provided for oscillatory service which has the high load capacity of conventional slider bearings combined with the virtually infinite life of an elastomeric bearing at light loads, and with the capability of being designed for angular oscillation of relatively large magnitude. The deflection of the elastomer, and the maximum stress that can occur in it, are limited to the deflection corresponding to the radial gap between the surfaces 18 and 20 which can be predetermined to have the optimum value for any particular operating conditions or elastomer characteristics. A solid, uniform mass of elastomer 22 is shown so as to permit large angles of oscillation. Conventional laminated elastomeric bearing material could possibly be used, but is less desirable because the stress would be substantially higher and a very large number of layers would be required to permit a sufficiently great angular movement. The solid, non-laminated elastomeric member shown is, therefore, preferred.

Figure 2:
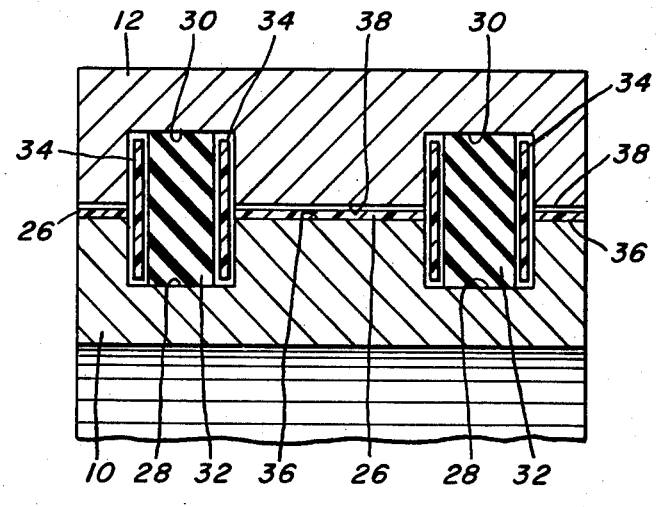
FIG. 2 is a sectional view of a bearing showing a modified form of the invention.

It will be understood that various modifications and other embodiments of the invention are possible. Thus, for example, FIG. 2 shows a configuration in which each of the bearing members 10 and 12 has two axially spaced recesses 28 and 30, respectively, forming cavities between them similar to the single cavity of FIG. 1. An annular elastomeric mass 32 is disposed in each of the cavities and bonded to the bearing members 10 and 12 as previously described. Restraining members 34 are placed on each side of each of the elastomeric masses 32 and may be similar to the members 24 described above. The bearing members 10 and 12 have cylindrical surfaces 36 and 38, respectively, on each side of each of the cavities radially spaced by the elastomers 32 in the manner previously described, and adapted to close the radial gap and engage each other under heavy loads. These surfaces are provided with lubricant surfaces or with lubricant material 26 similar to that described above to permit relative oscillatory movement of the members 10 and 12. It will be seen that the operation of this embodiment of the invention is the same as that of FIG. 1 with the same advantages.

Figure 3:
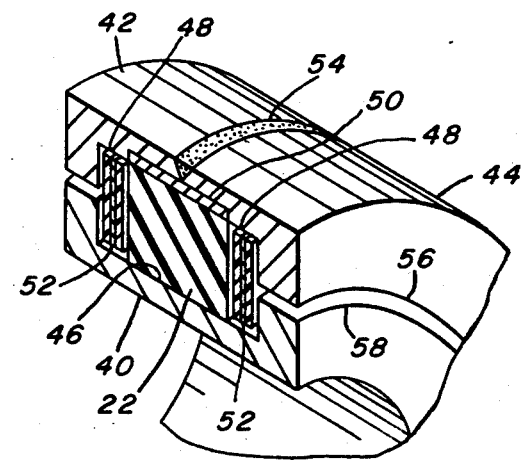
FIG. 3 is a view similar to FIG. 1 illustrating certain further modifications.

FIG. 3 shows a modified structure which is more readily manufactured than that of FIG. 1. As shown in FIG. 3, the inner bearing member 40 is similar to the inner member of FIG. 1, but the outer member is divided circumferentially into two sections 42 and 44 as shown. The inner member 40 has a recess 46 similar to that previously described and the outer members 42 and 44 have similar recesses 48 which, together with the recess 46, form a cavity for the elastomeric material 22 as described in connection with FIG. 1. In this construction, the elastomer has its inner surface bonded to the inner bearing member 40 and its outer surface is bonded to a separate steel ring 50 encircling the outside of the elastomer. Restraining members 52 similar to the members 24 are placed on each side of each elastomeric member to restrict axial deflection. In assembly of this structure, after the restraining members 52 have been placed in position and the elastomer has been bonded to the inner bearing member 40, the two outer members 42 and 44 are placed in position and welded to each other and to the ring 50, by electron beam welding for example, or otherwise, as indicated at 54. It will be seen that this structure is substantially the same as that of FIG. 1 and the operation is, of course, the same.

The restraining members 52 shown in FIG. 3 may be similar to those previously described but are shown as consisting of a steel ring with a layer or surface coating of lubricant material, such as polytetrafluoroethylene, bonded to or coated on each side of the ring. These members may be somewhat more desirable than those shown in FIG. 1 because of greater strength and better life but their operation is obviously the same. The bearing structure shown in FIG. 3 does not include any lubricant means between the opposed cylindrical surfaces 56 of the inner and outer bearing members. This structure as shown is, therefore, usable only as an elastomeric bearing for oscillatory service under light load, but it has the desirable features described above of limiting the deflection of the elastomeric material, and the resulting stress, under heavy loads since the gap between the inner and outer bearing members closes at a predetermined load corresponding to the maximum allowable radial deflection of the elastomer 22, the axial deflection being limited by the members 52 as described above. This structure, therefore, is similar to that of FIG. 1 in that high loads are carried by the engaging surfaces 56, but it does not have the slider bearing capability. The structure shown in FIG. 3 could, of course, be converted into a hydbrid type bearing like that of FIG. 1 by providing suitable lubrication for the engaging cylindrical surfaces 56 such as the lubricant material 26 of FIG. 1.

I claim as my invention:

1. A bearing for oscillatory service comprising relatively rotatable inner and outer concentric bearing members, a mass of elastomeric material disposed between said bearing members in non-sliding contact therewith, said bearing members having opposed cylindrical surfaces normally spaced apart radially by said elastomeric material, said spaced surfaces being adapted to engage each other under a predetermined radial load to limit radial deflection of said elastomeric material, and means for limiting axial deflection of the elastomeric material.

2. A bearing as defined in claim 1 in which said means for limiting axial deflection comprises an annular member on each side of the elastomeric material in position to engage the elastomeric material to limit axial deflection thereof.

3. A bearing as defined in claim 2 in which said annular members have engaging surfaces of a material having lubricant properties.

4. A bearing as defined in claim 1 in which said elastomeric material is bonded to said bearing members.

5. A bearing as defined in claim 1 and including lubricant material between said engaging cylindrical surfaces.

6. A bearing as defined in claim 1 in which said bearing members have opposed cylindrical recesses forming a cavity, said elastomeric material being a solid, uniform mass disposed in said cavity and bonded to the bearing members.

7. A bearing as defined in claim 6 in which the means for limiting axial deflection of the elastomeric material comprises an annular member on each side of the mass of elastomeric material, said annular members being disposed in said cavity in position to engage the elastomeric material and having surfaces of material having lubricant properties.

8. A bearing as defined in claim 7 and including lubricant material between the engaging cylindrical surfaces of the bearing members.

* * * * *